United States Patent Office 3,517,812
Patented June 30, 1970

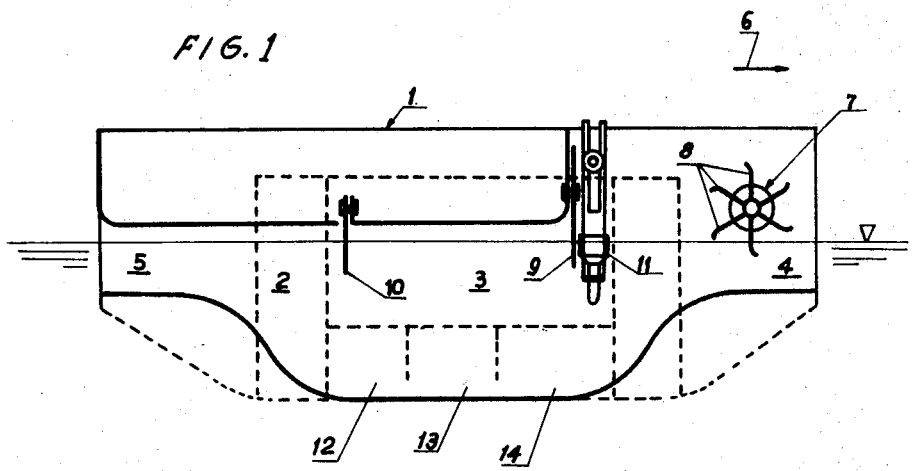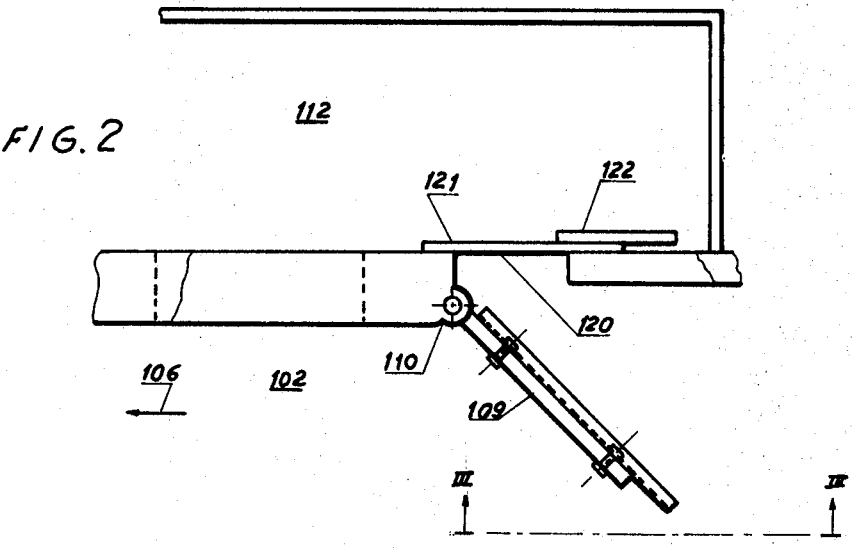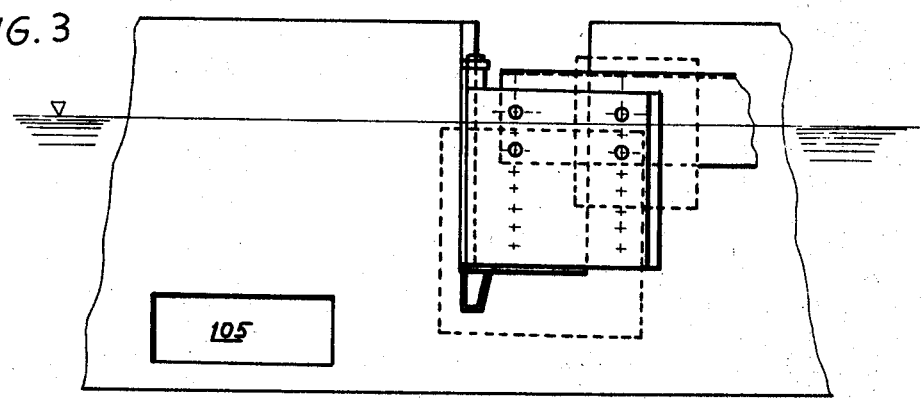

3,517,812
PROCESS AND APPARATUS FOR REMOVING
FLOATING WASTES FROM WATER SURFACES
Dario Bucchioni, Via Bengasi 19, and Mirella Forgione
De Toffoli, Viale Nazario Sauro 35, both of Leghorn,
Italy
Filed Sept. 28, 1967, Ser. No. 671,405
Claims priority, application Italy, Oct. 4, 1966,
28,252/66; Jan. 12, 1967, 1,080/67
Int. Cl. B01d *17/02*
U.S. Cl. 210—73                           8 Claims

ABSTRACT OF THE DISCLOSURE

A process for removing oily and other floating wastes from water surfaces comprises flowing at least the upper water layer through a canal and under at least one floodgate immersed a selected distance in the water and extending transversely of the direction of flow. The cross section of the canal is markedly increased under the floodgate, for example by increasing the depth of the canal, in order to decrease the velocity of the water and promote decantation. Wastes collecting in front of the floodgate are led off with a portion of the water to at least one decantation tank where the wastes are separated from the water. Apparatus for carrying out the process comprises a canal and at least one floodgate extending transversely of the canal and immersed to a selected depth in the water. Under the floodgate the depth of the canal is markedly increased to decrease the speed of the water. Means is provided for removing and decanting wastes collected in front of the floodgate.

---

The present invention has for its object a process to remove oily and other floating wastes from water surfaces, and apparatus for carrying out the process.

The waters of the harbors and areas close thereto are continuously polluted by oily and other floating waste coming from discharges into the sea from ships in the ports, and mainly from the washing of the tanks of tankers.

The systems for removing such oily waste from the water surfaces at present used, employ different methods:

(a) Sprinkling the water surfaces with chemical substances which, by combining with the floating hydrocarbons, make the latter precipitate to the sea bottom;

(b) Moving a band of cloth or similar material through the water to be cleaned, so that the oily wastes are collected by adhesion on such band which is then cleaned before starting a new cycle;

(c) Sucking off the upper layers of the water to be cleaned by pumps with a high delivery, decanting the water in tanks of large capacity, collecting the wastes which separate from the water due to the decantation.

The first of these methods is dangerous to the sea fauna and flora; the second has only a modest yield; the third requires great pumping power so that, in order to maintain the latter within reasonable limits, systems of high precision are necessary to define the height of the water layer to be delivered to the pump. All these methods, further, are not suitable with a sea even slightly rough, and moreover in said third method, during the passage through the pump, the wastes emulsify with the water, so that a larger capacity is required for an efficient decantation.

The process for removing oily or other floating waste from water surfaces according to the present invention is characterized in that it comprises channeling the upper layers of the water to be cleaned through a defined path with increasing depth in which the water, at a sufficiently slow speed, is compelled to pass under a floodgate lowered to a selected depth into the water current, so as to cause a decreased rate of flow of the current and a stagnation of the circulation in the zone just upstream of said floodgate; then suitably removing for further decantation the solid and liquid wastes which gather and concentrate upstream of said floodgate, due to the lowering of the current from which said wastes have time to separate owing to the difference in density, and then gathering in the wastes with a reduced fraction of water with respect to that channeled into said path.

The process is also characterized in that a decrease in the speed of the water current upstream of and under the area of stagnation caused by said floodgate, is obtained by providing said path preferably in the shape of a canal, the depth of which increases from an area immediately upstream to a zone under said floodgate immersed into the upper layers of the liquid current; though without causing either turbulence in the canal, or a wave motion at the inlet of the water into the canal, which could prevent the channeling of the floating waste.

The decreased rate of the current speed is maintained downstream of the floodgate, keeping the maximum depth of said canal for said selected distance; in which section the floating wastes, owing to the slow speed, separate from the water current and are detained by one or more floodgates arranged transversely to the current and immersed into the water for an adjustable depth.

The method is further characterized in that the relative motion of the water with respect to the defined path in the canal towards the separation floodgate, is obtained by associating said canal with a movable floating means or through a stationary canal when the water to be cleaned has a motion of its own, or through a suitable system for conveying the water into the canal without causing either turbulence or wave motion.

The method is still further characterized in that all or part of said transverse floodgates, instead of being stationary or at an adjustable height, are floating.

The method is finally characterized in that the wastes collected by the floodgate are suitably conveyed towards the collection points, preferably by means of a floodgate suitably arranged and shaped.

A device suitable for carrying out the above-mentioned method is characterized in that it comprises a preferably self propelled floating means which is provided along its entire length with a longitudinal canal provided with a bottom; at least one transverse floodgate being partially immersed in the superficial layers of the liquid current flowing in the canal; wherein the depth of said canal increases up to a maximum upstream of the first floodgate and then preferably decreases downstream of the last floodgate.

The superficial layers of the water to be cleaned are preferably pushed into said canal by means of a system of one or more reels or belts provided with blades which are preferably flexible so as to prevent whirlpools from forming.

The device is also characterized in that is comprises one or more hopper-shaped collecting means which may be arranged at an adjustable height for collecting the material gathered upstream of each of the floodgates. Said hopper-shaped collecting means preferably has a lateral surface not diverging upwards, so as to avoid movement of the waste away from said collecting means upon lowering the latter; said collecting means being further connected, through straight conduits to the first of a group of decantation tanks provided with drainage of the decanted water from the bottom, said tanks being arranged in cascade.

In a different preferred embodiment of the device, the canal of variable depth is stationary and is connected in series or shunt with a canal of usual type for conveying a current of water.

The device is further characterized in that the floodgate partly immersed into the liquid current is turnable with respect to the direction of the current, so as to convey the floating waste towards a suitable lateral discharge port and arranged to be drawn near one side of the canal, when it is necessary to have the entire width of the canal free.

The device is finally characterized in that the discharge port is adjustable in width and height and is connected to a decantation tank, the bottom of the latter being connected to the canal downstream the partly immersed floodgate.

The objects, advantages and characteristics of the invention will further appear in the following description of preferred embodiments chosen by way of example only, with reference to the accompanying drawings, in which:

FIG. 1 is a diagrammatic vertical longitudinal section of a device according to the invention mounted on a preferably self-propelled floating vessel;

FIG. 2 is a diagrammatic plan view of a device according to the invention, mounted on a stationary canal of usual type for conveying running waters;

FIG. 3 is a perspective view of FIG. 2 taken in the direction of arrows III—III.

With reference to FIG. 1, a vessel 1, preferably self-propelled, is provided throughout its entire length with a canal 2, the depth of which is substantially greater in the central zone 3 (where it may reach the whole load draft of the vessel) than at the bow and stern ends 4 and 5 respectively (where such a depth comprises substantially the thickness of the superficial layer of the water containing the waste to be removed). The arrow 6 indicates the normal direction of movement of the vessel. A reel 7 provided with flexible blades 8 is rotated when the vessel cannot move, in order to cause the relative motion of the liquid current in the canal 2. A hopper-shaped collecting means 11 is arranged at adjustable height to collect wastes from in front of the floodgate 9. Decantation tanks 12, 13 and 14 are arranged in cascade, the first being connected to the collecting means 11.

The device works as follows: the water current entering at the bow end 4 is subject to a substantial slowing owing the widening of the passage section in the central zone 3. Such slowing favours the decantation of the floating wastes which stop and gather before the floodgates 9 and 10. The lowering of the fluid current under said floodgate causes in front of the floodgates slow whirlpools which retain the floating wastes, and the latter are then conveyed to the decantation tanks by the collecting means 11.

FIGS. 2 and 3 illustrate an application of the process of the invention to a canal 102 through which a liquid flows in the direction of arrow 106. A decantation tank 112, provided with collecting means, not shown, is connected to the canal 102 through a return passage 105. A floodgate 109 is articulated at 110 on the side wall of the canal in such a way as to swing against the side wall of the canal, so as to leave the passage free when desired. Such a floodgate has a limited height and is partly immersed into the liquid current. In usual working position, its position is as shown in FIG. 2, so as normally to convey the floating wastes, intercepted by the floodgate, towards the discharge port 120 opening into the tank 112. The port 120 is provided with movable slidegates 121 and 122 for adjusting the width and height of the port. Obviously, under the floodgate 109 the canal depth is increased in order to slow down the water speed correspondingly and thus favor the decantation and the treatment of the waste contained therein. Further, the floodgate 109 may be provided with suitable means for adjusting the height thereof as a function of the level of the liquid in the canal.

Although preferred embodiments of apparatus for carrying out the invention have been illustrated by way of example in the drawings and described above, it will be understood that features of each embodiment are applicable to the other and that many changes and modifications may be made within the scope of the appended claims.

What we claim is:

1. A method for removing oily and other floating waste from water surfaces comprising, channeling a flow of water the upper layers of which are to be cleaned through a channel having a constant dimensioned inlet, and continuously decreasing the speed of flow of said upper canalized layers of the flow of water to be cleaned by slowly and progressively increasing the depth of the channel wherein said water flows until the flow reaches a maximum depth, at the same time maintaining substantially constant the breadth of said canalized layers of water so that the speed of said canalized layers of water decreases slowly and progressively flowing the slowed down canalized water flow under a floodgate immersed in the upper layers of said canalized and slowed down water flow, so as to develop a turbulence-free stagnation in a zone immediately upstream of said floodgate, in said upper layers of water of said canalized flow and then removing for decantation the solid and liquid floating wastes which gather and concentrate in said upper layers of said flow immediately upstream of said floodgate.

2. A method as claimed in claim 1 in which, the canal of variable depth is stationary and is connected in shunt with a channel for conveying running waters.

3. A method as claimed in claim 2 in which, the floodgate partly immersed into the liquid current is turnable with respect to the current direction, so as to convey the floating waste towards a suitable lateral discharge port and to be in position to be drawn near one of the channel sides when it is necessary to have free the entire width thereof.

4. A method as claimed in claim 3 in which, said discharge port is adjustable in width and height and is connected to a decantation tank the bottom of which is connected to said channel downstream the partly immersed floodgate, and is further provided with means for removing the waste collected therein.

5. A method as claimed in claim 1, wherein the depth of said channel increases slowly and continuously from an inlet end portion upstream of said floodgate to a zone where said floodgate is located; said depth remaining constant then decreasing up to an outlet end portion of the channel.

6. A method as claimed in claim 1, wherein relative motion of the water with respect to the channel is obtained by advancing said channel as a movable floating channel through a body of water to be cleaned.

7. A device for removing oily and other floating waste from water surfaces, comprising a propellable floating vessel which is provided from bow to stern with a longitudinal channel provided with a bottom; the bottom of said channel being everywhere lower than the free level of the water when said vessel is floating; in operation said channel receiving a water flow water therethrough from which oily and other floating waste are to be removed from the upper layers thereof, said vessel comprising a traverse floodgate in said channel partly extending downwardly into the upper layers of the water flow when flowing in said channel, the channel having a constant dimensioned inlet and the depth of said channel increasing slowly and progressively from said inlet to a maximum depth upstream of the floodgate and then decreasing downstream of the floodgate whereby the flow of water canalized in said channel is progressively slowed and forced to flow below said floodgate to develop a turbulence-free stagnation in the upper layers of water of said canalized flow in a zone immediately upstream of said floodgate.

8. A device as claimed in claim 7, including decantation tanks arranged in cascade in said vessel having drainage for removing decanted water therefrom, a hopper-shaped means connected to a decantation tank and disposed substantially upstream of said floodgate for collecting waste from said upper layers of flow of water and having an inlet edge below the surface of the flow of water to allow water from the upper layers of water in said flow of water to flow into said hopper-shaped means and then said decantation tanks.

References Cited

UNITED STATES PATENTS

| | | | |
|---|---|---|---|
| 1,530,078 | 3/1925 | Haynes | 210—242 |
| 1,889,601 | 11/1932 | Heinkel | 210—538 X |
| 2,670,848 | 3/1954 | Van Houten et al | 210—242 X |
| 2,876,903 | 3/1959 | Lee | 210—242 |
| 3,219,190 | 11/1965 | Thune | 210—242 |

FOREIGN PATENTS 307,854   9/1916   Germany.

JOHN W. ADEE, Primary Examiner

U.S. Cl. X.R.

210—84, 242, 262, 255, 540